United States Patent [19]

Lane, Jr.

[11] Patent Number: 5,390,874
[45] Date of Patent: Feb. 21, 1995

[54] VEHICLE SENSITIVE RETRACTOR

[75] Inventor: Wendell C. Lane, Jr., Romeo, Mich.

[73] Assignee: TRW Vehicle Safety Systems Inc., Lyndhurst, Ohio

[21] Appl. No.: 119,941

[22] Filed: Sep. 10, 1993

[51] Int. Cl.[6] .......................................... B65H 75/48
[52] U.S. Cl. ................................................. 242/384.6
[58] Field of Search ........ 242/107, 107.9 R, 107.4 A, 242/107.4 B, 384.6; 280/801 A, 806, 807

[56] References Cited

U.S. PATENT DOCUMENTS

| | | | |
|---|---|---|---|
| 3,889,898 | 6/1975 | Ziv | 242/107.4 R |
| 3,937,416 | 2/1976 | Henderson | 242/107.4 A |
| 3,985,314 | 10/1976 | Booth | 242/107.4 A |
| 4,244,537 | 1/1981 | Labeur | 242/107.4 A |
| 4,253,621 | 3/1981 | Seel | 242/107.4 A |
| 4,351,496 | 9/1982 | Fohl | 242/107.4 A |
| 4,605,180 | 8/1986 | Fisher, III et al. | 242/107.4 A |
| 4,667,893 | 5/1987 | Föhl | 242/107.4 A X |
| 4,726,540 | 2/1988 | Ches et al. | 242/107.4 A |
| 4,763,853 | 8/1988 | Andersson | 242/107.4 A |
| 4,856,727 | 8/1989 | Schmidt et al. | 242/107.4 B |

FOREIGN PATENT DOCUMENTS

2537453 3/1976 Germany .............................. 280/806

*Primary Examiner*—Stanley N. Gilreath
*Assistant Examiner*—John P. Darling
*Attorney, Agent, or Firm*—Tarolli, Sundheim & Covell

[57] ABSTRACT

A vehicle seat belt retractor (10) has a spool (20) on which seat belt webbing (26) is wound. An externally-toothed ratchet wheel (50) is rotatable with the spool (20) in a belt withdrawal direction (22). A first pawl (70) is supported on a housing (12) for pivotal movement about a first axis (72) into engagement with the ratchet wheel (50) to block rotation of the ratchet wheel (50) in the belt withdrawal direction (22). An inertia member (62) supported on the housing (12) is movable in response to vehicle deceleration greater than a predetermined deceleration to pivot the first pawl (70) into engagement with the ratchet wheel (50) and thereby block rotation of the ratchet wheel (50) and the spool (20) in the belt withdrawal direction (22). A second pawl (90) is supported on the housing (12) for pivotal movement relative to the ratchet wheel (50) about a second axis (92) spaced from the first axis (72). The first pawl (70) has a portion for supporting the second pawl (90) and for effecting movement of the second pawl (90) about the second axis (92), upon movement of the first pawl (70) about the first axis (72), into a ready position. The second pawl (90), when in the ready position, is engageable with the ratchet wheel (50) to block rotation of the ratchet wheel (50) and thus of the spool (20) in the belt withdrawal direction (22).

9 Claims, 3 Drawing Sheets

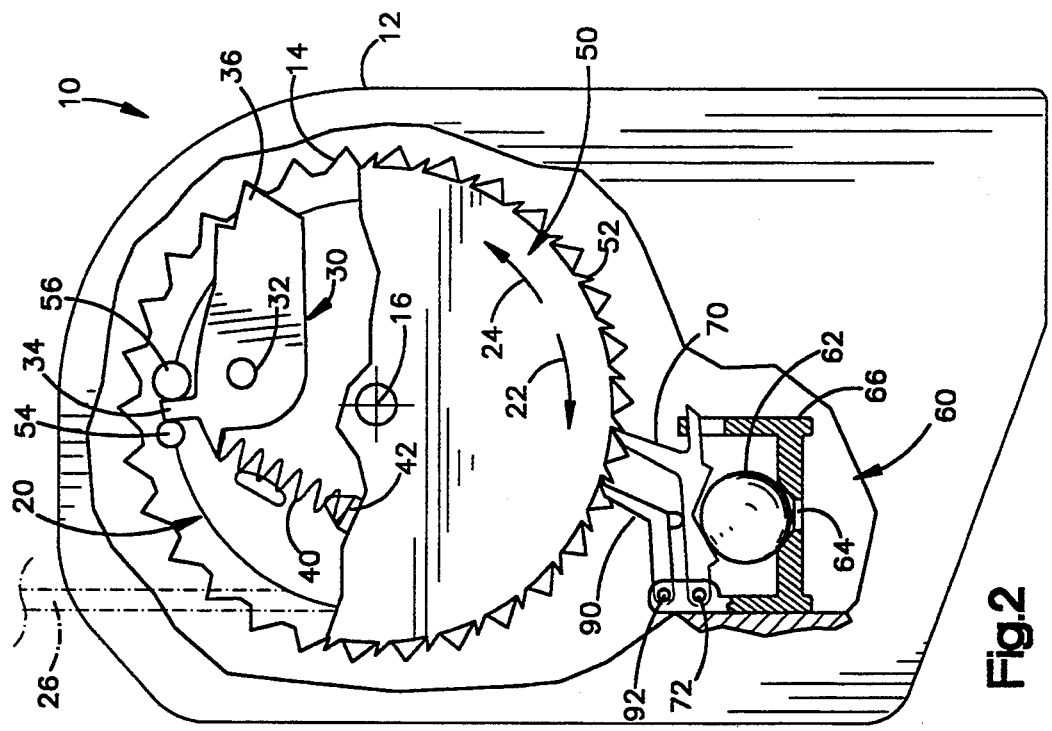
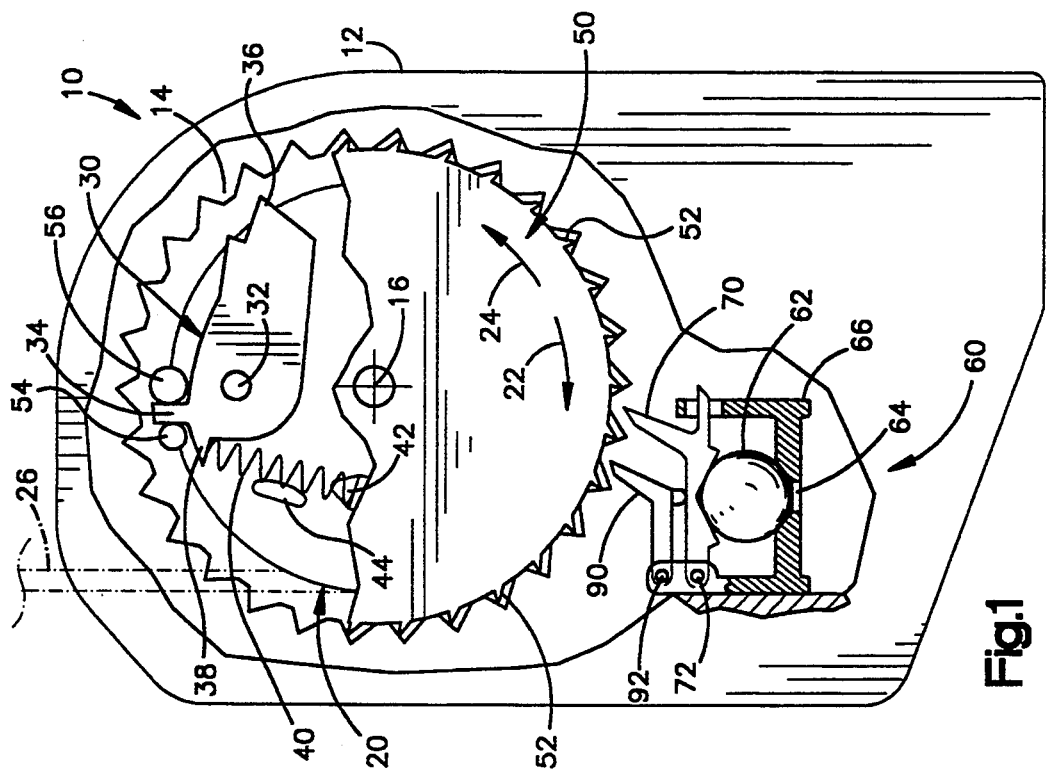

5,390,874

VEHICLE SENSITIVE RETRACTOR

BACKGROUND OF THE INVENTION

1. Technical Field

The present invention relates to a vehicle seat belt retractor having a spool on which seat belt webbing is wound. The spool can be blocked from rotation in the belt withdrawal direction in response to deceleration of the vehicle greater than a predetermined deceleration.

2. Description of the Prior Art

Some vehicle seat belt retractors include a vehicle sensitive locking mechanism. A typical vehicle sensitive locking mechanism includes an inertia member supported for movement on a retractor housing. In the event of deceleration of the vehicle greater than a predetermined deceleration, the inertia member moves relative to the housing to move a lock pawl into engagement with a ratchet wheel. Engagement of the lock pawl with the ratchet wheel blocks rotation of the retractor spool in the belt withdrawal direction.

SUMMARY OF THE INVENTION

The present invention is a vehicle seat belt retractor including a housing and a spool on which belt webbing is wound. The spool is rotatable in belt withdrawal and belt retraction directions. An externally-toothed ratchet wheel is rotatable with the spool in the belt withdrawal direction. A first pawl is supported on the housing for pivotal movement relative to the ratchet wheel about a first axis. An inertia member is supported on the housing and is movable in response to vehicle deceleration greater than a predetermined deceleration to effect pivotal movement of the first pawl into engagement with the ratchet wheel to block rotation of the ratchet wheel in the belt withdrawal direction. The retractor includes spool locking means responsive to the blocking of rotation of the ratchet wheel in the belt withdrawal direction for blocking rotation of the spool in the belt withdrawal direction.

A second pawl is supported on the housing for pivotal movement relative to the ratchet wheel about a second axis spaced from the first axis. The first pawl has a portion for supporting the second pawl and for, upon movement of the first pawl about the first axis, effecting movement of the second pawl about the second axis into a ready position. When the second pawl is in the ready position, the second pawl is engageable with the ratchet wheel to block rotation of the ratchet wheel in the belt withdrawal direction. Thus, should the first pawl fail to block rotation of the ratchet wheel, the second pawl can block such rotation, thereby locking the spool.

BRIEF DESCRIPTION OF THE DRAWINGS

Further features and advantages of the present invention will become apparent to one of ordinary skill in the art to which the present invention pertains from a reading of the following description with reference to the accompanying drawings, in which:

FIG. 1 is a schematic view of a seat belt retractor embodying the present invention and having a vehicle sensitive locking mechanism shown in an unactuated condition;

FIG. 2 is a view similar to FIG. 1 showing the locking mechanism of FIG. 1 in an actuated condition;

DESCRIPTION OF PREFERRED EMBODIMENTS

Figure 3:
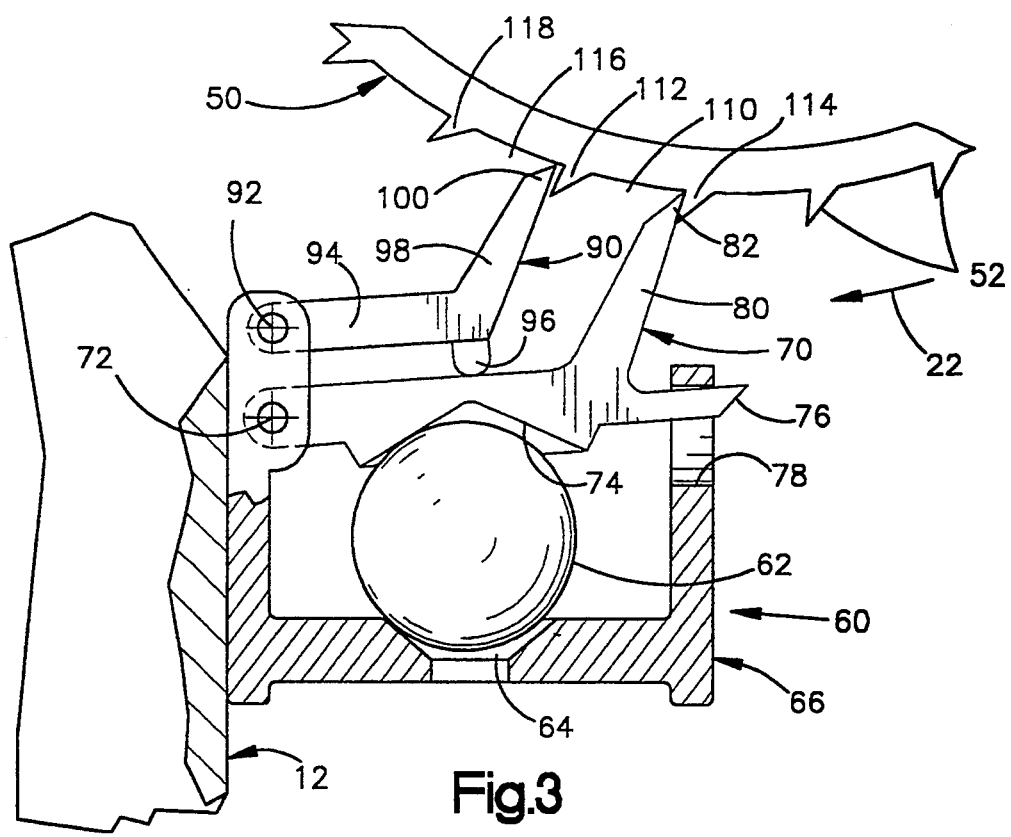
FIG. 3 is an enlarged view of a portion of FIG. 2.

The present invention relates to a vehicle sensitive retractor and particularly to a vehicle sensitive seat belt retractor for restraining movement of an occupant of a vehicle in the event of deceleration of the vehicle greater than a predetermined deceleration. The present invention is applicable to various retractor constructions. As representative of the present invention, FIG. 1 illustrates a retractor 10. The retractor 10 includes a housing 12 which is fixedly connected to the vehicle in a manner not shown. A plurality of internal teeth 14 on the housing 12 are disposed in a circular array about an axis 16 of the retractor 10.

The retractor 10 includes a spool 20 which is rotatable about the axis 16 in a belt withdrawal direction 22 and a belt retraction direction 24. Seat belt webbing 26 is wound about the spool 20 and extends from the retractor 10. The seat belt webbing 26 is extensible about the vehicle occupant to restrain movement of the vehicle occupant.

A lock lever 30 is pivotally mounted on a mounting hub 32 fixed for rotation with the spool 20. The lock lever 30 has a tab portion 34 projecting radially outwardly in a direction generally away from the axis 16. The lock lever 30 has at one end a locking tip 36 and at the other end a spring tab 38.

A compression spring 40 extends between a spring mount 42 on the spool 20 and the spring tab 38 of the lock lever 30. A spring guide 44 on the spool 20 maintains the spring 40 in position between the spring mount 42 and the lock lever spring tab 38. The spring 40 biases the lock lever 30 into a position as shown in FIG. 1 in which the lock lever tip 36 is spaced radially inwardly away from, and out of engagement with, the internal teeth 14 on the retractor housing 12.

The retractor 10 also includes a clutch disk or ratchet wheel 50 rotatable about the axis 16. The ratchet wheel 50 has on its outer perimeter a plurality of external teeth 52 disposed in a circular array about the axis 16. The ratchet wheel 50 includes two circumferentially spaced control pins 54 and 56 disposed one on either side of the radially-projecting tab portion 34 of the lock lever 30.

The retractor 10 includes a vehicle sensitive locking mechanism 60 (FIG. 1). The locking mechanism 60 includes a vehicle deceleration sensing inertia member 62, which may be, for example, a steel ball. The inertia member 62 rests in a cavity 64 in a sensor housing 66 fixed to the retractor housing 12.

A primary pawl 70 (FIGS. 1 and 3) is supported on the inertia member 62. The primary pawl 70 is connected with the sensor housing 66 for pivotal movement relative to the sensor housing about an axis 72. The primary pawl 70 includes a cup portion 74 (FIG. 3) which extends generally horizontally in a direction from the axis 72 over the inertia member 62. A stop portion 76 of the primary pawl 70 extends through an opening 78 in the sensor housing 66 to limit movement of the primary pawl relative to the sensor housing. A portion 80 of the primary pawl 70 extends upwardly from the cup portion 74 and terminates in a primary pawl tip 82.

A secondary pawl 90 (FIG. 3) is supported on the primary pawl 70. The secondary pawl 90 is connected with the sensor housing 66 for pivotal movement relative to the sensor housing about an axis 92. The secondary pawl axis 92 is spaced upwardly from the primary pawl axis 72 in a direction generally toward the ratchet wheel, 50, and extends parallel to the axis 72. The secondary pawl 90 has a horizontally extending portion 94 with a support portion 96 resting on the primary pawl 70. A portion 98 of the secondary pawl 90 extends upwardly from the horizontally extending portion 94 and terminates in a secondary pawl tip 100.

When the vehicle in which the retractor 10 is mounted is not experiencing a deceleration greater than a predetermined deceleration, the vehicle sensitive locking mechanism 60 is in an unactuated condition as shown in FIG. 1. In this unactuated condition, the inertia member 62 rests in the cavity 64 in the bottom of the sensor housing 66. The tip 82 of the primary pawl 70 and the tip 100 of the secondary pawl 90 are both spaced away from the external teeth 52 of the ratchet wheel 50. The vehicle sensitive locking mechanism 60 does not block rotation of the ratchet wheel 50 or the spool 20 in the belt withdrawal direction 22. The vehicle occupant can move forward relative to the vehicle seat, withdrawing belt webbing 26 from the retractor 10.

Upon deceleration of the vehicle greater than a predetermined deceleration, the inertia member 62 moves relative to the sensor housing 66. The inertia member 62 moves out of the cavity 64 and pivots the primary pawl 70 upwardly. Upward pivotal movement of the primary pawl 70 effects upward pivotal movement of the secondary pawl 90. The pawls 70 and 90 move upward toward the ratchet wheel 50 from the position shown in FIG. 1 to the position shown in FIGS. 2 and 3. The primary pawl tip 82 is disposed in a gap 110 between two adjacent teeth 112 and 114 on the ratchet wheel 50. The secondary pawl tip 100 is disposed in a gap 116 between the tooth 112 and an adjacent tooth 118.

Any subsequent withdrawal of belt webbing 26 from the retractor spool 20 causes rotation of the spool in the belt withdrawal direction 22. The lock lever 30 rotates with the spool 20, and the lock lever tab portion 34 pushes on the ratchet wheel control pin 56 to cause the ratchet wheel 50 to rotate in the belt withdrawal direction 22. The ratchet wheel 50 rotates until the tooth 114 engages the tip 82 (FIG. 3) of the primary pawl 80. Engagement of the primary pawl 80 with the ratchet wheel 50 blocks further rotation of the ratchet wheel 50, and of the control pins 54 and 56, in the belt withdrawal direction 22.

Continued withdrawal of belt webbing 26 from the spool 20 causes the spool 20 and the lock lever mounting hub 32 to rotate in the belt withdrawal direction. The ratchet wheel control pin 56 now tends to retard rotation of the lock lever tab portion 34 of the lock lever 30. The lock lever 30 pivots on the mounting hub 32, against the biasing force of the spring 40. The lock lever tip 36 moves outwardly from the position shown in FIG. 1 to the position shown in FIG. 2 and engages one of the internal teeth 14 of the retractor housing 12. Thereafter, the lock lever 30 transmits rotational force from the spool 20 to the retractor housing 12, which is fixed to the vehicle, thus blocking rotation of the spool 20 in the belt withdrawal direction 22. This blocks withdrawal of belt webbing 26 from the retractor 10 to restrain forward movement of the vehicle occupant.

When the primary pawl tip 82 is in engagement with the ratchet tooth 114, as shown in FIG. 3, the tip 100 of the secondary pawl 90 is in a ready position disposed in the gap 116 between the adjoining ratchet teeth 112 and 118. The distance between the secondary pawl tip 100 and the primary pawl tip 82 is slightly greater than the distance between adjacent ratchet teeth 52. Thus, secondary pawl tip 100 is spaced away from the ratchet wheel tooth 112 by a small distance in the belt withdrawal direction 22. If the primary pawl 70 is damaged or broken or for some other reason is not able to block rotation of the ratchet wheel 50 in the belt withdrawal direction 22, then the ratchet wheel tooth 112 almost immediately rotates into engagement with the secondary pawl tip 100. The secondary pawl 90 then blocks further rotation of the ratchet wheel 50 in the belt withdrawal direction. This blocking of rotation of the ratchet wheel 50 in the belt withdrawal direction 22 results in blocking of rotation of the spool 20 in the belt withdrawal direction in the manner described above.

Figure 4:
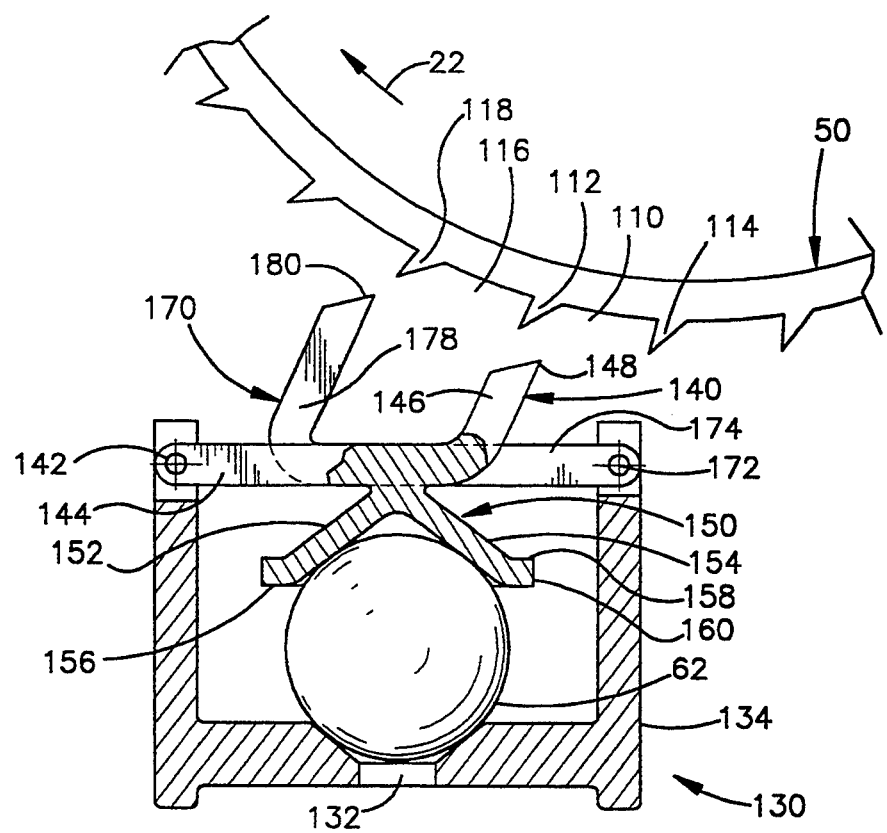
FIG. 4 is a fragmentary sectional view of a vehicle sensitive locking mechanism in accordance with a second embodiment of the invention, shown in an unactuated condition.
Figure 5:
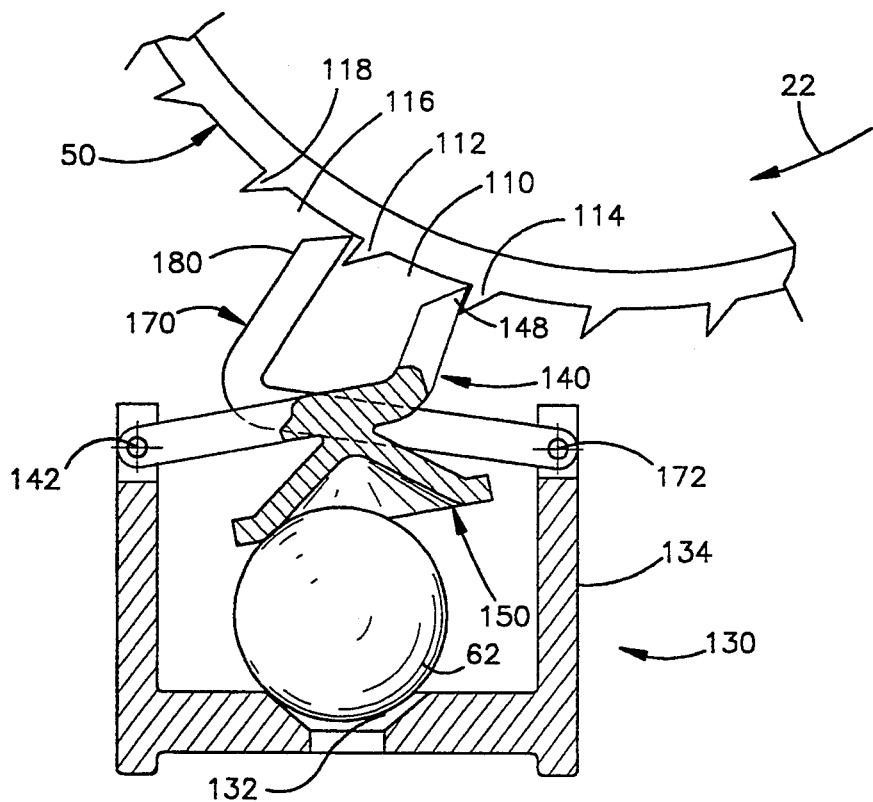
FIG. 5 is a view similar to FIG. 4 showing the locking mechanism of FIG. 4 in an actuated condition.
Figure 6:
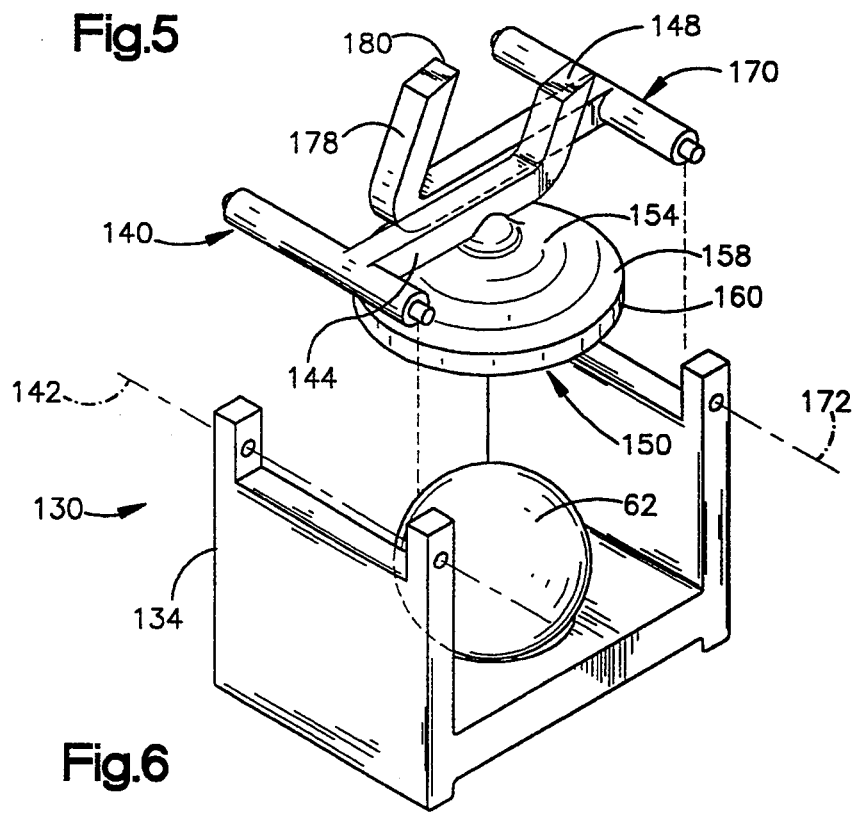
FIG. 6 is an exploded perspective view of the locking mechanism of FIGS. 4 and 5.

FIGS. 4–6 illustrate a vehicle deceleration sensing mechanism 130 in accordance with a second embodiment of the invention. The following description assumes that the vehicle deceleration sensing mechanism 130 is incorporated in the retractor 10 in place of the sensing mechanism 60 of FIGS. 1–3.

The vehicle deceleration sensing mechanism 130 includes an inertia member 62. The inertia member 62 rests in a cavity 132 in a sensor housing 134 affixed to the retractor housing 12.

A primary pawl 140 is connected with the sensor housing 134 for pivotal movement relative to the sensor housing about an axis 142. The primary pawl 140 has a portion 144 extending horizontally in a direction from the axis 142 over the inertia member 62. A portion 146 of the primary pawl 140 extends upwardly from the horizontally extending portion 144 and terminates in a primary pawl tip 148.

An actuator cup 150 is formed as one piece with the primary pawl 140. The actuator cup 150 includes a cup portion 152 having an upper surface 154 and a rim portion 156 having an upper surface 158 and a side surface 160. The actuator cup portion 152 rests on the inertia member 62.

The vehicle deceleration sensing mechanism 130 also includes a secondary pawl 170 connected for pivotal movement with the sensor housing 134 about an axis 172. The axis 172 is on the opposite side of the inertia member 62 from the axis 142 (left to right as viewed in FIG. 4). The secondary pawl 170 has a portion 174 extending horizontally in a direction from the axis 172 over the actuator cup 150. The secondary pawl portion 174 rests on the upper surface 154 of the actuator cup 150. A portion 178 of the secondary pawl 170 extends upward from the horizontal portion 174 and terminates in a secondary pawl tip 180.

When the vehicle in which the retractor 10 is mounted is not experiencing a deceleration greater than a predetermined deceleration, the sensing mechanism 130 is in an unactuated condition as shown in FIG. 4. In this condition, the inertia member 62 rests in the cavity 132 in the bottom of the sensor housing 134. The primary pawl 140 and the secondary pawl 170 are both spaced away from the external teeth 52 of the ratchet wheel 50.

Upon deceleration of the vehicle at a rate above a predetermined rate, the inertia member 62 moves relative to the sensor housing 134 out of the cavity 132. Movement of the inertia member 62 pivots the primary pawl 140 upwardly. Upward pivotal movement of the primary pawl 140 effects upward pivotal movement of the secondary pawl 170. Both pawls 140 and 170 move upward toward the ratchet wheel 50 from the position shown in FIG. 4 to the position shown in FIG. 5. The tip 148 of the primary pawl 140 moves into the gap 110 between the adjacent teeth 112 and 114 on the ratchet wheel 50. The tip 180 of the secondary pawl 170 moves into the gap 116 between the ratchet teeth 112 and 118.

The locking mechanism 130 is then in the actuated condition shown in FIG. 5. Subsequent withdrawal of belt webbing 26 (FIG. 1) from the retractor spool 20 causes rotation of the spool 20 in the belt withdrawal direction 22. The lock lever 30 rotates with the spool 20, and the lock lever tab portion 34 pushes on the ratchet wheel control pin 56 to cause the ratchet wheel 50 to rotate in the belt withdrawal direction 22.

The ratchet wheel 50 rotates until the ratchet tooth 114 (FIGS. 4 and 5) engages the tip 148 of the primary pawl 140. Engagement of the ratchet wheel 50 with the primary pawl 140 blocks further rotation of the ratchet wheel, and of the control pins 54 and 56, in the belt withdrawal direction 22. Continued withdrawal of belt webbing 26 from the spool 20 results in pivotal movement of the lock lever 30 and in the blocking of rotation of the spool 20 in the belt withdrawal direction 22, in the manner described above.

When the primary pawl tip 148 (FIG. 5) is in engagement with the ratchet tooth 114, the tip 180 of the secondary pawl 170 is disposed in the gap 116 between the teeth 112 and 118 on the ratchet wheel. The distance between the secondary pawl tip 170 and the primary pawl tip 148 is slightly greater than the distance between adjacent teeth on the ratchet wheel 50. The secondary pawl tip 170 is thus spaced a small distance in the belt withdrawal direction 22 away from the ratchet tooth 112. If the primary pawl 140 is damaged or broken or for some other reason is not able to block rotation of the ratchet wheel 50 in the belt withdrawal direction 22, then the ratchet wheel tooth 112 rotates into engagement with the tip 180 of the secondary pawl 170. The secondary pawl 170 blocks further rotation of the ratchet wheel 50 in the belt withdrawal direction 22. This blocking of rotation of the ratchet wheel 50 in the belt withdrawal direction 22 results in the blocking of rotation of the spool 20 in the belt withdrawal direction, in the manner described above.

From the foregoing description of the invention, those skilled in the art will perceive improvements, changes and modifications in the invention. Such improvements, changes and modifications within the skill of the art are intended to be covered by the appended claims.

I claim:

1. A vehicle seat belt retractor comprising:
   a housing;
   a spool on which seat belt webbing is wound and which is rotatable in belt withdrawal and belt retraction directions;
   an externally toothed ratchet wheel rotatable with said spool in the belt withdrawal direction;
   a first pawl supported on said housing for pivotal movement relative to said ratchet wheel about a fixed first axis into engagement with said ratchet wheel to block rotation of said ratchet wheel in the belt withdrawal direction;
   an inertia member supported on said housing and movable in response to vehicle deceleration greater than a predetermined deceleration to effect pivotal movement of said first pawl into engagement with said ratchet wheel to block rotation of said ratchet wheel in the belt withdrawal direction;
   spool locking means responsive to the blocking of rotation of said ratchet wheel in the belt withdrawal direction for blocking rotation of said spool in the belt withdrawal direction; and
   a second pawl supported on said housing for pivotal movement relative to said ratchet wheel about a second axis spaced from said first axis, said first pawl having a portion for supporting said second pawl and for, upon movement of said first pawl about said first axis, effecting pivotal movement of said second pawl about said second axis into a ready position in which said second pawl is engageable with said ratchet wheel to block rotation of said ratchet wheel in the belt withdrawal direction.

2. A vehicle seat belt retractor as set forth in claim 1 wherein said second axis is spaced from said first axis in a direction generally toward said ratchet wheel, said second axis extending generally parallel to said first axis.

3. A vehicle seat belt retractor as set forth in claim 1 wherein said spool locking means comprises a plurality of internal teeth on said housing, a lock lever pivotally mounted on said spool for rotation with said spool, spring means for biasing said lock lever to a position spaced inwardly from said internal teeth, and a pin on said ratchet wheel, rotation of said spool relative to said ratchet wheel in the belt withdrawal direction causing said ratchet wheel pin to move said lock lever outward into engagement with an internal tooth on said housing to block rotation of said spool in the belt withdrawal direction.

4. A vehicle seat belt retractor as set forth in claim 3 wherein said ratchet wheel is coaxial with said spool, said spool rotating relative to said ratchet wheel upon the blocking of rotation of said ratchet wheel in the belt withdrawal direction to effect actuation of said spool locking means.

5. A vehicle seat belt retractor as set forth in claim 1 wherein said first and second pawls have pawl tips and the tip of said first pawl when in the locking position is spaced apart from the tip of said second pawl by a distance slightly greater than the distance between adjacent teeth on said ratchet wheel, said second pawl being engageable with said ratchet wheel to block rotation of said ratchet wheel in the belt withdrawal direction upon rotation of said ratchet wheel in the belt withdrawal direction.

6. A vehicle seat belt retractor comprising:
   a housing;
   a spool on which seat belt webbing is wound and which is rotatable in belt withdrawal and belt retraction directions;
   an externally toothed ratchet wheel rotatable with said spool in the belt withdrawal direction;
   a first pawl supported on said housing for pivotal movement relative to said ratchet wheel about a first axis into engagement with said ratchet wheel to block rotation of said ratchet wheel in the belt withdrawal direction;

an inertia member supported on said housing and movable in response to vehicle deceleration at a rate above a predetermined rate to effect pivotal movement of said first pawl into engagement with said ratchet wheel to block rotation of said ratchet wheel in the belt withdrawal direction;

spool locking means responsive to the blocking of rotation of said ratchet wheel in the belt withdrawal direction for blocking rotation of said spool in the belt withdrawal direction; and a second pawl supported on said housing for pivotal movement relative to said ratchet wheel about a second axis spaced from said first axis, said first pawl having a portion for supporting said second pawl and for, upon movement of said first pawl about said first axis, effecting pivotal movement of said second pawl about said second axis into a ready position in which said second pawl is, upon the occurrence of further rotation of said ratchet wheel in the belt withdrawal direction, engageable with said ratchet wheel to block rotation of said ratchet wheel in the belt withdrawal direction;

wherein said second axis is spaced from said ratchet wheel by about the same distance as said first axis, said first and second axes being disposed on opposite sides of said inertia member.

7. A vehicle seat belt retractor comprising:
a housing;
a spool on which seat belt webbing is wound and which is rotatable in belt withdrawal and belt retraction directions;
an externally toothed ratchet wheel rotatable with said spool in the belt withdrawal direction;
a first pawl supported on said housing for pivotal movement relative to said ratchet wheel about a first axis into engagement with said ratchet wheel to block rotation of said ratchet wheel in the belt withdrawal direction;
an inertia member supported on said housing and movable in response to vehicle deceleration at a rate above a predetermined rate to effect pivotal movement of said first pawl into engagement with said ratchet wheel to block rotation of said ratchet wheel in the belt withdrawal direction;
spool locking means responsive to the blocking of rotation of said ratchet wheel in the belt withdrawal direction for blocking rotation of said spool in the belt withdrawal direction; and
a second pawl supported on said housing for pivotal movement relative to said ratchet wheel about a second axis spaced from said first axis, said first pawl having a portion for supporting said second pawl and for, upon movement of said first pawl about said first axis, effecting pivotal movement of said second pawl about said second axis into a ready position in which said second pawl is, upon the occurrence of further rotation of said ratchet wheel in the belt withdrawal direction, engageable with said ratchet wheel to block rotation of said ratchet wheel in the belt withdrawal direction;

wherein said first pawl when in the locking position is spaced apart from said second pawl by a distance slightly greater than the distance between adjacent teeth on said ratchet wheel, said second pawl being engageable with said ratchet wheel to block rotation of said ratchet wheel in the belt withdrawal direction upon further rotation of said ratchet wheel in the belt withdrawal direction; and wherein said first pawl comprises an actuator cup engaging an upper surface of said inertia member, said first pawl and said actuator cup being formed as one piece.

8. A vehicle seat belt retractor as set forth in claim 7 wherein said second pawl has a portion resting on said actuator cup.

9. A vehicle seat belt retractor comprising:
a housing;
a spool on which seat belt webbing is wound and which is rotatable in belt withdrawal and belt retraction directions;
an externally toothed ratchet wheel rotatable with said spool in the belt withdrawal direction;
a first pawl supported on said housing for pivotal movement relative to said ratchet wheel about a first axis into engagement with said ratchet wheel to block rotation of said ratchet wheel in the belt withdrawal direction;
an inertia member supported on said housing and movable in response to vehicle deceleration at a rate above a predetermined rate to effect pivotal movement of said first pawl into engagement with said ratchet wheel to block rotation of said ratchet wheel in the belt withdrawal direction;
spool locking means responsive to the blocking of rotation of said ratchet wheel in the belt withdrawal direction for blocking rotation of said spool in the belt withdrawal direction; and
a second pawl supported on said housing for pivotal movement relative to said ratchet wheel about a second axis spaced from said first axis, said first pawl having a portion for supporting said second pawl and for, upon movement of said first pawl about said first axis, effecting pivotal movement of said second pawl about said second axis into a ready position in which said second pawl is spaced from said ratchet wheel and said first pawl is in engagement with said ratchet wheel, said second pawl being engageable with said ratchet wheel to block rotation of said ratchet wheel in the belt withdrawal direction in response to failure of said first pawl to block rotation of said ratchet wheel in the belt withdrawal direction.

* * * * *